March 14, 1967 W. RANK 3,309,460

PLAYBACK OF HIGH-FREQUENCY SIGNALS RECORDED ON A MAGNETIC TAPE

Filed Nov. 2, 1964

Inventor:

Wolfgang Rank 3,309,460
PLAYBACK OF HIGH-FREQUENCY SIGNALS RECORDED ON A MAGNETIC TAPE Wolfgang Rank, Kronach, Upper Franconia, Germany, assignor to Loewe Opta G.m.b.H., Berlin, Germany, a company of Germany Filed Nov. 2, 1964, Ser. No. 408,419
Claims priority, application Germany, Nov. 6, 1963, L 46,255
3 Claims. (Cl. 178—6.6)

Figure 1:
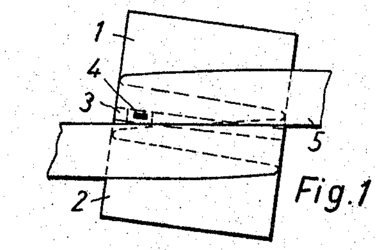

The present invention relates to playback of high-frequency signals recorded on a magnetic tape.

It is an object of the invention to provide a simple and effective means for producing a playback without disturbances.

In a known method for magnetic recording and playback of high-frequency signals, more particularly television signals, a magnetic tape is passed in approximately one turn helically round a fixed cylinder which is inclined to its base. The guiding cylinder consists of two halves coaxially abutting on each other between which rotates a disc with one or several video magnetic heads fixed to its periphery. Through the relative motion between the rotating magnetic heads and the magnetic tape running over the guiding cylinder the recording of the television signals proceeds in magnetic tracks which are not continuous but succeed each other temporally and lie parallel to each other and obliquely to the longitudinal direction of the tape. In playing back and/or scanning the tape, therefore, the resulting signal is not continuous but the signal potential is divided into periods each corresponding to the length of a recorded track on the tape. Conventionally each magnetic track contains a complete field (interlaced scanning) so that the interruption of the playback signal potential on transition from the end of one track to the beginning of the following track falls into the vertical blanking interval between two fields. In this way no picture "information" is lost through the track transitions, but the interruptions occurring at the transitions do cause a strong disturbance impulse which according to the type of modulation and demodulation of the TV signals oversteps positively or negatively the level of the playback signal potential. The image disturbances bound up with this can be avoided in a known manner by so-called regenerators with which the disturbance impulses are blanked, and the horizontal impulses lost during the interruption are restored. Such arrangements, however, call for relatively high technical expenditure.

It is the aim of the invention to compensate in a simple manner, in a magnetic recording and playback system without regenerative device, disturbance impulses in the playback signal, which impulses can be caused not only by the interruptions on transition from one magnetic track to the next, but rather also, e.g. through drop-outs in the magnetic tape.

An important element for the understanding of the invention is that the TV signal to be recorded frequency-modulates in a known manner a carrier, and that the resulting FM signal is recorded on the magnetic tape. In playing back, the frequency-modulated carrier is first limited in amplitude and then demodulated. The periodic interruptions between successive fields are expressed in the limited carrier by a brief, complete collapse of the carrier amplitude, while drop-outs cause the carrier amplitude to collapse more or less. These collapses are equal to deep fades.

According to the invention the undesirable influence of interfering impulses on synchronism in image playback can be avoided by a device for reproducing television signals recorded in a frequency modulated form in parallel tracks obliquely or transversally on a magnetic tape comprising a rotatable mounted reproducing head, a preamplifier, a limiter, a demodulator, and a video amplifier, the output of which being connected with a monitor input, the output of said demodulator being connected by a peak-responsive rectifier circuit, generating a compensating D.C. voltage in case of deep fades of said limited FM-television signal, in series with an adjustable resistance.

Figure 2:
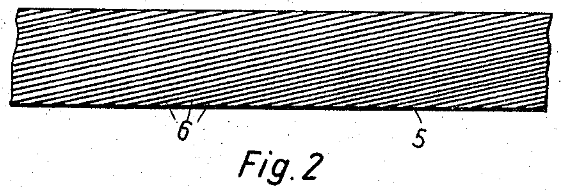
Figures 3A, 3B, 4, 5A, 5B:
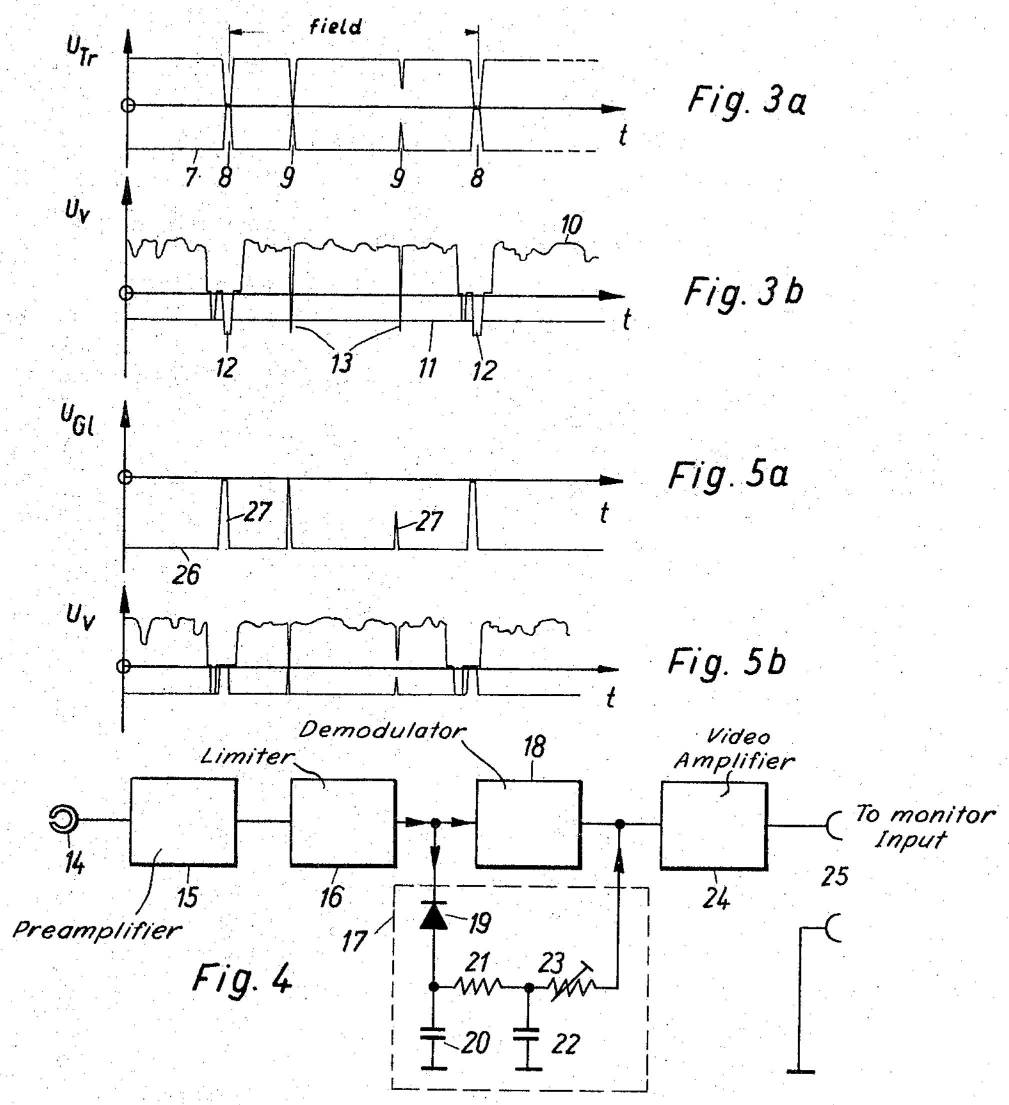

Further details of the invention are explained with the aid of an exemplary design contained in the accompanying drawing in which FIG. 1 shows a schematic view of a magnetic tape guide cylinder for recording and playing back TV signals, FIG. 2 is a fragment of a magnetic tape with recording tracks marked in oblique lines, FIG. 3*a* is a diagram explaining the dependence of amplitude of the frequency modulated carrier ($U_{TR}$) upon time ($t$), FIG. 3*b* is a diagram showing the dependence of amplitude of the demodulated image signal voltage ($U_V$) upon time ($t$), FIG. 4 is a block diagram for the application of the method in accordance with the invention, FIG. 5*a* is a diagram of the corrective voltage ($U_{G1}$) obtained through peak-responsive rectification of the frequency-modulated carrier voltage, and FIG. 5*b* is a diagram showing the dependence of the amplitude of the demodulated and corrected image signal voltage ($U_V$) upon time ($t$).

In FIG. 1, 1 and 2 mark two cylinders positioned coaxially one upon another and inclined to the horizontal plane, between which cylinders a video magnetic head 4 fixed to the periphery of a disc 3 rotates. Round the guide cylinders runs helically in approximately one turn a magnetic tape 5, which is moved with a uniform speed from a supply reel (omitted from the drawing to clear the view) on to a take-up reel, but first looping round the cylinder. In recording, the magnetic head 4, fed with frequency-modulated image signals, records on the magnetic tape parallel, temporally successive signal tracks 6, which run obliquely to the direction of the tape. Each magnetic track contains a complete field. The transition from the end of one to the beginning of the next track causes in playing back a TV recording a strong disturbance impulse which appears in the playback frequency-modulated signal voltage 7 (FIG. 3*a*) as deep fades 8. Drop-outs in the magnetic layer of the tape have a similar effect in partial nicks 9. The demodulated image signal voltage 10 (FIG. 3*b*) then is characterized by disturbance peaks 12, 13 corresponding to the nicks 8 and/or 9 and is overstepping in the negative direction the synchronous level 11. The peaks are in the transition between one magnetic track and the next approximately quadrilateral (12) and in the drop-outs approximately needle-shaped (13). The interference voltage peaks cause, particularly in the range of the image content, disturbance of synchronization in image playback. They must therefore be avoided.

This problem is solved by feeding the frequency-modulated image signal voltage, which is scanned by a playback head 14, FIG. 4, amplified in a preamplifier stage 15 and limited in a limiter stage 16, to a peak-responsive rectifier circuit 17 and to a FM demodulator 18. The peak-responsive rectifier circuit consists of a diode 19 connected between the limiter stage 16 and the demodulator 18, which diode is earthed over a charging condenser 20 and connected to a series resistance 21. To resistance 21 are connected a filter condenser 22 and an adjustable series resistance 23 which is connected to the demodulator output. The signal voltage, demodulated and relieved of disturbance voltage peaks, can after amplifying in the video amplifier 24 be picked up at the output terminals 25.

The new circuit acts as follows:

The peak-responsive rectifier circuit 17 scans the envelope curve of the frequency-modulated carrier voltage 7 (FIG. 3*a*) containing the image signal, the charging condenser 20 charging itself up to the obtaining peak value of the carrier voltage. If the carrier voltage were to contain no nicks 8, 9, the point contact rectifier circuit would supply a constant D.C. voltage to the demodulator output. However, the gaps or nicks cause a D.C. voltage 26 (FIG. 5*a*) proportional to the irregular envelope curve, which direct voltage after addition with the output voltage of demodulator 18 (FIG. 4) produces an image signal voltage $U_V$ with the temporal course shown in FIG. 5*b*. A shift of potential of the image signal voltage through superposition with the D.C. voltage can be corrected in a known manner and therefore needs no special treatment here. As the curve in FIG. 5*b* shows, the nicks 27 in the D.C. voltage in FIG. 5*a* compensate the interference voltage peaks 12, 13 (FIG. 3*b*) which would occur in the absence of the method in accordance with the invention. A prerequisite for the compensation is the same polarity of disturbance voltage peaks and D.C. voltage $U_{G1}$. The compensating D.C. voltage added to the demodulated image signal voltage can e.g. be so great that by changing the adjustable resistance 23 (FIG. 4) the amplitudes of the corrective impulses 27 (FIG. 5*a*) together with the amplitudes of the disturbance impulses 12, 13 (FIG. 3*b*) produce exactly the black-level value of the image signal voltage and consequently show in the playback TV image as black places causing only little disturbance. The time constant of the peak-response rectifier circuit is appropriately dimensioned so that nicks in the carrier voltage envelope curve of about 2 $\mu$s. duration and above are accurately scanned and so that on the other hand the carrier frequency itself is completely filtered out.

The present method is suitable for all magnetic image recording and playback systems in which the image signals are recorded in parallel tracks running obliquely to the direction of the tape.

What I claim is:

1. A device for reproducing television signals recorded in a frequency-modulated form in parallel tracks obliquely or transversally on a magnetic tape comprising a rotatable mounted reproducing head, a preamplifier, a limiter, a demodulator, and a video amplifier, said reproducing head, said preamplifier, said limiter, said demodulator and said video amplifier being connected in series, the output of said video amplifier being connected with a monitor input, the output and input of said demodulator being connected by a peak-responsive rectifier circuit, generating a compensating D.C. voltage in case of deep fades of said limited FM-television signal, in series with an adjustable resistance.

2. A device as claimed in claim 1, wherein said peak-responsive rectifier circuit consists of a rectifier in series with a pi-type filter.

3. A device for reproducing television signals recorded in a frequency-modulated form in parallel tracks obliquely or transversally on a magnetic tape comprising a rotatable mounted reproducing head, a preamplifier, a limiter, a demodulator, and a video amplifier, said reproducing head, said preamplifier, said limiter, said demodulator and said video amplifier being connected in series, the output of said video amplifier being connected with a monitor input, the output and input of said demodulator being connected by a peak-responsive rectifier circuit, generating a compensating D.C. voltage in case of deep fades of said limited FM-television signal, in series with an adjustable resistance, said peak-reponsive rectifier circuit consists of a rectifier in series with a pi-type filter, the time constant of said peak-responsive rectifier circuit being chosen so that only deep fades cause proportional change in said compensating D.C. voltage of such an amount that the sum of deep fades and of the compensating voltage corresponds to the black level value of the demodulated video signal.

References Cited by the Examiner

UNITED STATES PATENTS

| | | | |
|---|---|---|---|
| 3,087,012 | 4/1963 | Rappold | 178—7.3 |
| 3,155,910 | 11/1964 | Mann | 325—478 |

DAVID G. REDINBAUGH, *Primary Examiner.*

JOHN W. CALDWELL, *Examiner.*

H. W. BRITTON, *Assistant Examiner.*